United States Patent
Adams

[15] 3,645,296
[45] Feb. 29, 1972

[54] POWER-ASSISTED STEERING AND LIKE SYSTEMS

[72] Inventor: Frederick John Adams, Campton, near Shefford, England

[73] Assignee: Cam Gears Limited, Hitchin, England

[22] Filed: Oct. 31, 1969

[21] Appl. No.: 872,919

[52] U.S. Cl. .................137/625.69, 137/625.24, 91/375 A
[51] Int. Cl. ....................................F16k 11/07, F15b 9/10
[58] Field of Search ............. 91/375 A, 368; 137/625.69, 137/625.24

[56] References Cited

UNITED STATES PATENTS

| | | | |
|---|---|---|---|
| 2,809,532 | 10/1957 | Ethington et al. | 91/368 |
| 3,218,937 | 11/1965 | Dettlof | 91/368 |
| 3,292,499 | 12/1966 | Duffy | 91/368 |
| 3,457,836 | 7/1969 | Henderson | 91/368 |

*Primary Examiner*—Paul E. Maslousky
*Attorney*—Hill, Sherman, Meroni, Gross & Simpson

[57] ABSTRACT

A power-assisting rack and pinion steering system including a housing, relatively rotatable torque input and output shafts mounted for rotation in the housing, a pinion mounted for joint rotation on the torque output shaft, a rack engaging the pinion and a fluid valve assembly for controlling the flow of fluid to and from the opposite ends of a double-acting servomotor also connected to the rack for assisting in the movement thereof. The valve assembly comprises a circumferentially grooved spool valve connected to one of said shafts for axial movement, such movement occurring when the shafts are rotated relative to one another. Axial movement of the spool valve establishes fluid communication between a power fluid pump and the servomotor for powered movement of the servomotor and hence the rack.

2 Claims, 3 Drawing Figures

PATENTED FEB 29 1972

INVENTOR
Frederick John Adams

BY          ATTYS.

POWER-ASSISTED STEERING AND LIKE SYSTEMS

This invention relates to power-assisted steering or like systems: that is to systems in which torque exerted by an operator in either sense is to result in a motion in corresponding sense, a double acting servomotor assisting the operator's effort. The invention relates to hydraulic power-assisted systems, and is intended mainly to be applied to rack-and-pinion systems in which the pinion is rotated by the operator and the corresponding movements of the rack are assisted by a hydraulic double acting motor connected directly to the rack.

By the invention, there is afforded a compact and economic steering unit power-assisted by fluid pressure, especially suitable for vehicles, and of the king in which the servovalve elements are mounted coaxially with the input shaft, and in which the driver has direct mechanical connections between his wheel and the pinion (or other finally driven element), whilst the servovalve is responsive to the applied torque so that power assistance is in the sense corresponding to steering wheel movement, and in magnitude is a function of the torque applied by the driver; and the device can afford a sense of "-feel."

According to the invention, there is provided a steering unit of the kind stated in which the input and output members are interconnected by follower means riding in a helical track formed in one such member and a second track formed in the other such member, the second track lying transversely to said helical track whereby said follower means has an axial component of movement when said members rotate relatively to each other as they do subject to resilient resistance to applied steering torque, the resulting axial movement operating the spool valve. There is preferably a torsion bar connection between the input shaft and pinion (or equivalent element) which can not only transmit torque and yield according to its magnitude and sense, but also prevent any effective axial movement between the parts which it connects. As a precaution there may be provided a dog arrangement capable of taking up the steering loads should there by a failure in the normal force path, or should there be excessive torque.

The invention can be followed more easily from the following descriptions of three examples, namely of vehicle steering gear, assisted by the accompanying drawings in which the relevant parts are illustrated. In these drawings.

Figure 1:
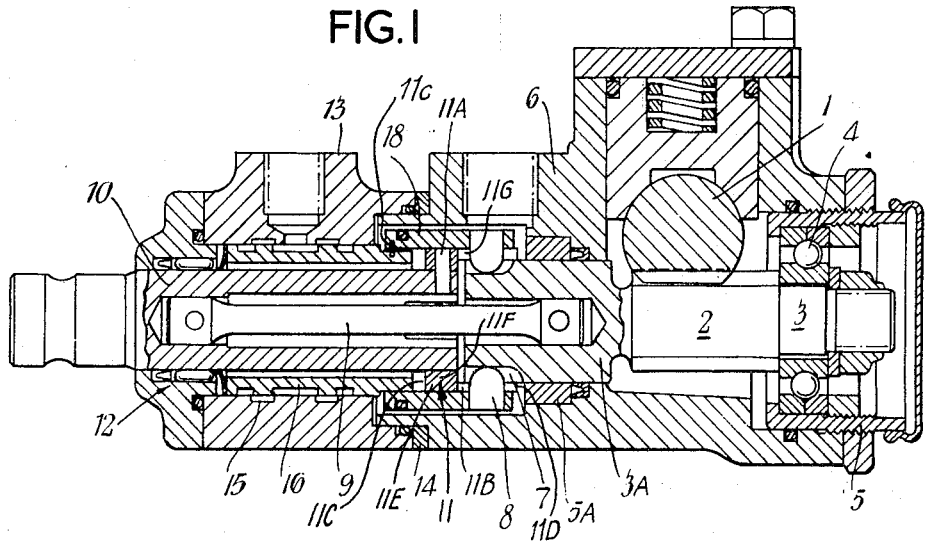
FIG. 1 represents a sectional elevation of one example.

A rack is indicated at 1, engaged by a pinion 2 which is mounted on a spindle 3 borne at 4 and 5 by ball and needle bearings in a pinion housing 6. The housing 5 of thrust bearing 4 is axially connected to the pinion housing 6 by means of screw threads, and thus housing 5 can be axially adjusted to obtain the correct hydraulic balance between the stationary valve element 13 and the movable spool 16. The housing can then be locked into position by a locknut (not shown in diagram). The inner end of the spindle 3 is formed as a hollow cylindrical element 3A, in the external surface of which are formed follower grooves or slots 7, of arcuate cross section to fit a pair of steel pegs 8 tracked therein. These pegs being followers which engage in the helical tracks 7. Within the element 3A is pinned one end of a torsion bar 9 of which the other end is pinned in the bore of the hollow input shaft 10, which is deemed to be connected to the steering column.

The shaft 10 terminates clear of the element 3A, and at this end there is secured to it externally by a pin 11A, a sleeve 11 which extends to surround the element 3A. In the sleeve 11 at 11B are axially directed follower grooves or slots, in which the pegs 8 are caged in the sense that the pegs can move axially relatively to the input shaft 10, but not circumferentially.

The input shaft 10 is borne and sealed (e.g., as shown at 12) in a valve body 13, which is secured endwise through a spacer 14 to the pinion housing 6.

The servovalve is of spool type and comprises fixed outer formations such as the grooves 15 in the body 13, and an axially movable spool 16 with complementary formations the spool 16 is connected by a pin 11C to a sleeve member 18 to which the pegs 8 are attached either by welding or some other permanent means. The spool valve and the ducting to and from it, as also minor details of construction such as seals etc., follow well-known practice in the art; the valve is preferably of open-center type.

When the driver applies torque in one sense, the torque is applied to the pinion 2, and being transmitted through the torque rod 9 strains the latter correspondingly. Thus there is rotational movement between parts 11B and 3A, so that the pegs 8 in their helical tracks cause the element 18 and consequently the valve spool 16 to move axially. This axial movement of the valve spool 16 results from the fact that as the shaft 10, and thus the sleeve 11 to which it is connected by means of the pin 11A, are rotated jointly relative to the pinion 2 and to the element 3A, the peg 8 abuts and is rotatably driven by the axially extending sides of the slot 11B between which the peg 8, as well as the sleeve member 18, to which it is fixedly connected, and the valve spool 16 which is fixedly connected to the sleeve member 18 by means of the pin 11C, also rotate jointly with the shaft 10 under all operating conditions. However, the radially innermost end of the peg 8 extends into the helical track 7 formed in element 3A. Thus the peg 8 must shift axially when the slot 11B (through which it extends) rotates relative to the helical track 7 (into which the peg 8 extends). As the pegs 8 shift axially, the sleeve member 18, the pin 11C and the valve spool 16 must of necessity shift axially therewith, since all are fixedly interconnected. Consequently, rotation of the shaft 10 in one direction of rotation relative to the pinion 2 causes the peg 8, and therefore the valve spool 16, to shift axially in one direction, whereas rotation of the shaft 10 in an opposite direction relative to the pinion 2 causes the peg 8 and the valve spool 16 to shift axially in the opposite direction. Thus, the valve directs pressure fluid to one or other side of the double acting servomotor in the sense and to the extent dictated by the sense and magnitude of the driver's effort.

Between the end of the input shaft 10 and the element 3A, at 19, are provided dogs which are normally clear but which engage if there is excessive torsional strain in the rod 9, or failure; thus driver's effort can be positively transmitted to the pinion 2. Such an event might arise if there were a hydraulic failure.

From the foregoing it will be understood that the shaft 10, the sleeve 11 and the pin 11A move jointly and effectively operate as a single element. The sleeve 11 extends in an axial direction from one end wall 11C to an opposite end wall 11D and includes a major portion 11E, which extends from the end wall 11C to an intermediate wall 11F, and a relatively thin minor portion 11G, which extends from the intermediate wall 11F to the end wall 11D. The minor portion 11G axially overlaps and surrounds a portion of the element 3A. The axially extending slots 11B are formed in the minor portion 11G and overly the helical grooves 7 formed in the element 3A.

Just as the shaft 10, the sleeve 11 and the pin 11A are joined together in an essentially unitary construction, so are the spool 16, the sleeve member 18 and the pegs 8, which are interconnected for joint movement. They are capable of moving relative to the shaft 10, but only in an axial direction, since the slots 11B through which the pegs 8 extend permit relative axial movement but prevent relative rotational movement.

A brief description of the operation of the embodiment shown in FIG. 1 is as follows: In the absence of a torque being applied to the shaft 10, the spool 16 is in a neutral position as indicated in the drawing. The application of a torque to the shaft 10, however, will tend to rotate the shaft 10 relative to the spindle 3. This relative rotation between the shaft 10 and the spindle 3 will have the effect of shifting the spool 16 axially, relative to the shaft 10, to an operating position, whereby pressurized fluid flows through the spool 16 to provide power assist in a conventional manner.

Figure 3:
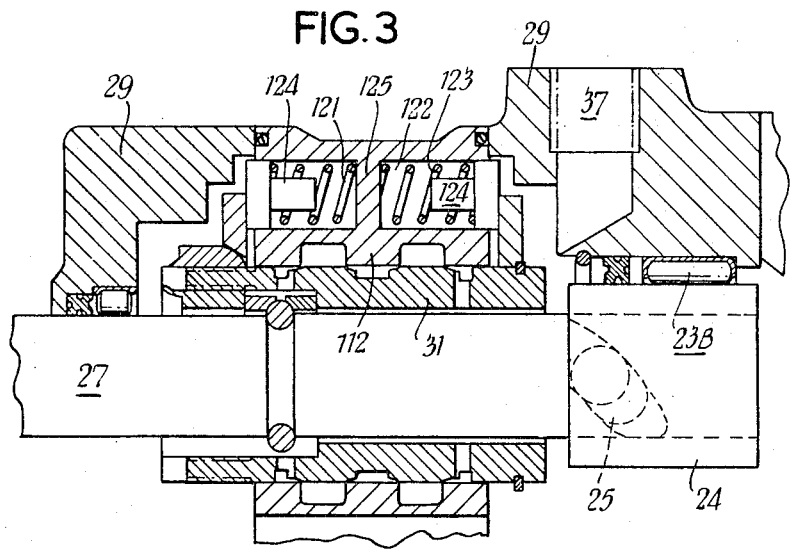
FIG. 3 is a modification of FIG. 2.
Figure 2:
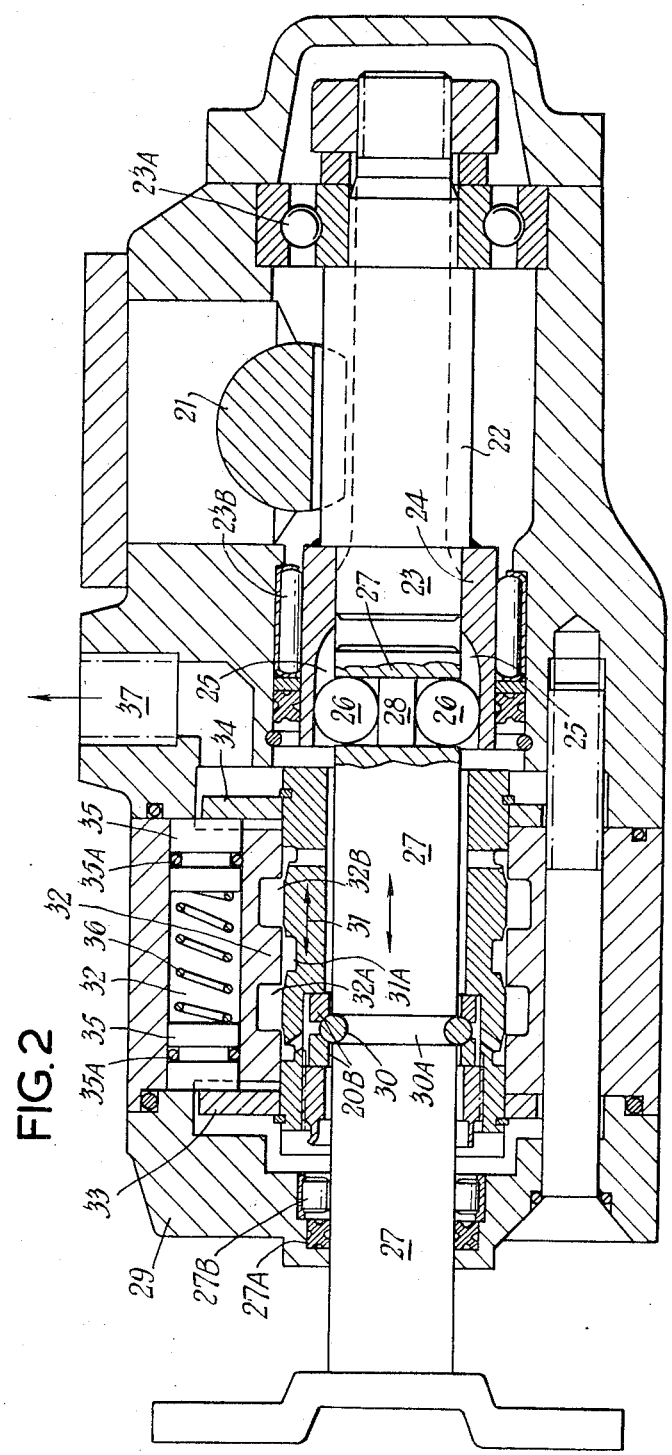
FIG. 2 represents a sectional elevation of another example.

Turning now to FIGS. 2 and 3 there is shown a variant of the resilient arrangements.

In FIG. 2, a conventional steering rack 21 is deemed to be connected to a double-acting hydraulic servomotor, as is well known in the art. The rack is engaged by pinion 22 on spindle 23 borne in rotation and thrust by ball bearing 23A and needle bearing 23B. The inner end of the spindle 23 is integrated by welding with a hollow cylindrical part 24 having internal helical grooves at 25 engaged by steel balls 26. The balls 26 are located in sockets formed by a diametral bore in the end of a spindle 27, a central spacer element 28 being provided of selected diameter, which controls the radial location of the balls 26. The spindle 27 extends through a spool valve assembly, and is sealed as at 27A and borne at 27B where is passes out of the valve housing or body 29. The outer end of the spindle 27 is connected to the steering column of the vehicle by means which allow the spindle to move axially.

The spindle 27 has a circumferential groove at 30A forming the inner race of a ring of balls 30. The balls 30 run in an outer race formed by two (relatively adjustable) cone collars 30B. The outer race is fixed in an inner spool valve element 31 which works by sliding in the outer valve element 32 which is integrated in the valve housing 29. The housing 29 has a ring of cylindrical bores 32 the ends of which are overlapped partly by disclike plates 33, 34, and partly by the housing 29. In each bore 32 is a pair of ferrules 35 (sealed by O-rings 35A) between which are compression springs 36. The plates 33, 34, move with the inner valve element 31. Thus if the element 31 moves to the left, spring 36 is compressed by plate 35 against the housing 29, and if the right is compressed by plate 33. The array of springs therefore tends to centralize the valve element 32 and thus the spindle 27 and balls 26.

The valve elements 31 and 32 are conventionally ported and the center groove 31A is connected to the source of pressure fluid, the grooves 32A or 32B connecting to one or other side of the servomotor of the rack 21, the alternative lands of the element 31 opening the alternative side of the servomotor to the return passage 37. The hydraulic circuit and valve details are part of well-known technique.

It may be noted that the fluid sealing at 35A may be dispensed with if the valve operation is to be nonreactive; that is to say if leakage or free pressure past the ferrules 35 is permitted. It will be noted also that the springs, since they resist movement of the balls 26 in the grooves 25, exert force of which the driver may be sensible, thus giving "feel" to the steering.

FIG. 3 illustrates a different spring arrangement. In this, the springs 36 of FIG. 2 are replaced by pairs of springs 121, 122 in twin coaxial bores 123, each spring 121, 122 bearing against a ferrule 124. The springs therefore react on the wall 125 which is part of the body 29, instead of the overlaps of FIG. 2. This figure incidentally, is also made to illustrate diagrammatically the helical grooves (shown in broken line) in the part 24.

In both figures can be seen various known devices which are used in assembly, such as circlips, seal rings, etc.

What we claim is:

1. A power-assisted steering unit comprising a housing including means forming a fluid inlet and a fluid outlet, input shaft means and output shaft means mounted on said housing for relative rotation on aligned axes, spool valve means rotatably carried in said housing and shiftable axially for controlling the flow of fluid between said fluid inlet and outlet, said spool valve means being disposed coaxially with and in surrounding relation to said input shaft means, first and second follower grooves formed respectively on said input shaft means and said output shaft means, said first follower groove being arranged axially with respect to the axes of said shaft means and said second follower groove being arranged helically with respect to the axes of said shaft means, cam follower means operatively engaging said first and second follower grooves and movable axially in response to relative rotation of said input means and said output shaft means and means connecting said cam follower means and said spool valve means for joint movement whereby said spool valve means rotates jointly with and shifts axially with respect to said input shaft means.

2. The invention as defined in claim 1 in which said first follower groove is disposed radially outwardly of and in axially overlapping relation with said second follower groove, and said cam follower means extends radially inwardly through said first follower groove and into said second follower groove.

* * * * *